United States Patent
Chung et al.

(10) Patent No.: US 8,589,907 B2
(45) Date of Patent: Nov. 19, 2013

(54) METHOD FOR UPDATING FIRMWARE OF SENSOR NODES ON A WIRELESS SENSOR NETWORK AND FIRMWARE UPDATER USING FOR THE SAME METHOD

(75) Inventors: Tae-Yun Chung, Gangneung-si (KR); Pan-Jong Park, Gangneung-si (KR); Dae-iL Kim, Gangneung-si (KR)

(73) Assignee: Gangneung-Wonju National University Industrial Academy Cooperation Group (KR)

( * ) Notice: Subject to any disclaimer, the term of this patent is extended or adjusted under 35 U.S.C. 154(b) by 440 days.

(21) Appl. No.: 12/990,611

(22) PCT Filed: May 4, 2009

(86) PCT No.: PCT/KR2009/002345
§ 371 (c)(1),
(2), (4) Date: Nov. 1, 2010

(87) PCT Pub. No.: WO2009/134108
PCT Pub. Date: Nov. 5, 2009

(65) Prior Publication Data
US 2011/0047538 A1    Feb. 24, 2011

(30) Foreign Application Priority Data

May 2, 2008   (KR) .................. 10-2008-0041176

(51) Int. Cl.
*G06F 9/44*       (2006.01)
*G06F 9/445*      (2006.01)
*G06F 15/177*     (2006.01)

(52) U.S. Cl.
USPC ........... 717/171; 717/168; 717/172; 717/176; 709/221

(58) Field of Classification Search
None
See application file for complete search history.

(56) References Cited

U.S. PATENT DOCUMENTS 5,689,640 A * 11/1997 Okanoue .................. 709/221
6,904,457 B2 * 6/2005 Goodman ................. 717/171

(Continued)

FOREIGN PATENT DOCUMENTS

| KR | 10-2006-0070165 | 6/2006 |
| KR | 10-2007-0064326 | 6/2007 |
| KR | 10-2007-0096316 | 10/2007 |

OTHER PUBLICATIONS

Lu De Yang, Implementation of a Wireless Sensor Network With EZ430-RF250 Development Tools and MSP430FG4618/F2013 Experimenter Boards From Texas Instruments; Aug. 2011; retrieved online on Sep. 5, 2013; pp. 1-70; Retrieved from the Internet <URL: http://etd.lsu.edu/docs/available/etd-07052011-154022/unrestricted/Yang_thesis.pdf>.*

(Continued)

*Primary Examiner* — Thuy Dao
*Assistant Examiner* — Hanh T Bui
(74) *Attorney, Agent, or Firm* — Cantor Colburn LLP (57) ABSTRACT

A firmware updating method for the new node includes (a) a new node searching for neighbor nodes located within a predetermined distance, (b) the new node designating a parent node among the searched neighbor nodes, (c) in the case where the plurality of nodes include a join receiving state for joining the new node to the wireless sensor network, the designated parent node and the new node establishing a communication link by using the join receiving state, (d) the parent node transmitting firmware to the new node through the established communication link and (e) the new node receiving the firmware from the parent node, updating existing firmware with the received firmware, and driving the updated firmware to be jointed to the wireless network.

5 Claims, 9 Drawing Sheets

(56) References Cited

U.S. PATENT DOCUMENTS

| | | | |
|---|---|---|---|
| 6,961,595 B2* | 11/2005 | Laroia et al. | 455/574 |
| 7,421,688 B1* | 9/2008 | Righi et al. | 717/172 |
| 7,860,952 B2* | 12/2010 | Haulin et al. | 709/221 |
| 7,873,959 B2* | 1/2011 | Zhu et al. | 717/172 |
| 8,204,968 B2* | 6/2012 | Lewis et al. | 709/221 |
| 8,484,652 B2* | 7/2013 | Teshome et al. | 717/176 |
| 2002/0091807 A1* | 7/2002 | Goodman | 709/221 |
| 2004/0029586 A1* | 2/2004 | Laroia et al. | 455/434 |
| 2005/0028001 A1* | 2/2005 | Huang et al. | 717/168 |
| 2005/0257206 A1* | 11/2005 | Semerdzhiev | 717/168 |
| 2006/0187866 A1* | 8/2006 | Werb et al. | 370/311 |
| 2006/0200814 A1* | 9/2006 | Kontinen et al. | 717/168 |
| 2007/0277169 A1* | 11/2007 | Rao et al. | 717/171 |
| 2010/0205596 A1* | 8/2010 | Chung et al. | 717/172 |
| 2011/0191764 A1* | 8/2011 | Piorecki | 717/168 |
| 2012/0102478 A1* | 4/2012 | Jeong | 717/171 |
| 2012/0198434 A1* | 8/2012 | Dirstine et al. | 717/172 |
| 2013/0104117 A1* | 4/2013 | Vedantham et al. | 717/172 |

OTHER PUBLICATIONS

Wanzhi Qiu et al.; Enhanced tree routing for wireless sensor networks; May 3, 2009; ACM; retrieved online on Sep. 5, 2013; pp. 638-650; Retrieved from the Internet <URL: http://www.sciencedirect.com/science/article/pii/S1570870508001017#>.*

Ju Wang et al.; A distributed wireless channel assignment algorithm with collision reduction; 2009; IEEE; retrieved online on Sep. 5, 2013; pp. 543-551; Retrieved from the Internet: <URL: http://ieeexplore.ieee.org/stamp/stamp.jsp?tp=&arnumber=5067525>.*

International Search Report—PCT/KR2009/002345 dated Dec. 29, 2009.

* cited by examiner

(12) United States Patent
US 8,589,907 B2

METHOD FOR UPDATING FIRMWARE OF SENSOR NODES ON A WIRELESS SENSOR NETWORK AND FIRMWARE UPDATER USING FOR THE SAME METHOD

TECHNICAL FIELD

The present invention relates to a method of updating firmware of a node of a wireless sensor network and a firmware update device used therefore, and more particularly, to a method of updating firmware capable of manually updating firmware of a node on the spot or automatically updating firmware of an error node without a process of recalling the nodes in the case where firmware updating is needed at the time of joining or repairing the node.

BACKGROUND ART

In general, a wireless sensor network (WSN) may be configured to include sensor nodes, sink nodes which receives information collected by a sensor field constructed with groups of sensor nodes, and a gateway which routes the information transmitted from the sink nodes and transmits the information through a broadband communication network to a management control server. The sensor node (hereinafter, referred to as a node) constituting the wireless sensor network is a node which senses physical or environmental information such as temperature, sound, vibration, and pressure. In general, each node is configured with a wireless communication module, a microprocessor, a power supply module, and a memory.

The nodes constituting the wireless sensor network are installed to be distributed over a wide area due to the characteristics of wireless communication. Particularly, the nodes prepared for a disaster such fire, flood, or earthquake may be installed in a rugged area such a mountain.

Therefore, in the case where a new sensor node is to be added to the wireless sensor network or in the case where a portion of the existing sensor nodes need to be repaired or updated with firmware, there is a problem in that the sensor nodes which are distributed over a wide area need to be recalled and the repaired sensor nodes need to be installed at their original sites. In addition, there is a problem in that much time and cost are needed.

DISCLOSURE

Technical Problem

The present invention is to provide a method of updating firmware of a node on the spot without recalling the node to a factory in the case where a node is newly joined to a wireless sensor network or in the case where a portion of the nodes constituting the wireless sensor network need to be repaired or updated.

The present invention is to provide a method of automatically updating firmware of a node constituting the wireless sensor network in the case where an error occurs in the node.

Technical Solution

According to a first aspect of the present invention, there is provided a method of updating firmware of a node on a wireless sensor network including a plurality of nodes, including steps of: (a) a new node searching for neighbor nodes located within a predetermined distance; (b) the new node designating a parent node among the searched neighbor nodes; (c) in the case where the plurality of nodes include a join receiving state for joining the new node to the wireless sensor network, the designated parent node and the new node establishing a communication link by using the join receiving state; (d) the parent node transmitting firmware to the new node through the established communication link; and (e) the new node receiving the firmware from the parent node, updating existing firmware with the received firmware, and driving the updated firmware to be jointed to the wireless network.

In the above aspect, it is preferable that each of the nodes of the wireless sensor network is configured based on a TDMA where an active duration and an inactive duration are alternately repeated, and the step (a) to (c) are performed during the active duration, and the step (d) is performed during the inactive duration.

In addition, it is preferable that each of the nodes has time slots including a transmit slot for data transmission, a transmit processing slot for processing after the data transmission, a receive slot for data reception, and a receive processing slot for processing after the data reception during the active duration, and in the step (c), the join receiving state is maintained in a receiving mode capable of receiving a signal from a different node during any one of the transmit processing slot and the receive processing slot.

In addition, it is preferable that the step (c) includes steps of: the new node transmitting a first command signal including firmware version information of the new node and a join request message to the parent node during the join receiving state of the parent node; in the case where the parent node receives the first command signal and the firmware version information of the received does not match with the version information of the parent node, the parent node transmitting a second command signal including a version non-matching message, a firmware transmission notifying message of the parent node, and a synchronization information message for transmitting firmware of the parent node to the new node; and the new node receiving the second command signal, generating a third command signal in response to the received second command signal, and transmitting the third command signal to the parent node during the join receiving state of the parent node.

According to a second aspect of the present invention, there is provided a method of updating firmware of a node on a wireless sensor network including a plurality of nodes by using a firmware update device capable of detecting and analyzing a received signal and storing firmware of nodes constituting the wireless sensor network, including steps of: (a) the firmware update device searching for neighbor nodes located within a predetermined distance; (b) the firmware update device designating an error node, of which the firmware is different from the firmware of the firmware update device, among the searched neighbor nodes; (c) in the case where the plurality of the nodes include a join receiving state for joining a new node to the wireless sensor network, the designated error node and the firmware update device establishing a communication link by using the join receiving state; (d) transmitting the firmware stored in the firmware update device to the error node through the established communication link; and (e) the error node receiving the firmware transmitted from the firmware update device, updating existing firmware with the received firmware, and after that, executing the update firmware.

In the above aspect, it is preferable that each of the nodes of the wireless sensor network is connected based on a TDMA where an active duration and an inactive duration are alternately repeated, and the step (a) to (c) are performed during the active duration, and the step (d) is performed during the inactive duration.

In addition, it is preferable that each of the nodes has time slots including a transmit slot for data transmission, a transmit processing slot for processing after the data transmission, a receive slot for data reception, and a receive processing slot for processing after the data reception during the active duration, and in the step (c), the join receiving state is maintained in a receiving mode capable of receiving a signal from a different node during any one of the transmit processing slot and the receive processing slot.

In addition, it is preferable that the step (c) includes steps of: the firmware update device transmitting a fourth command signal including the firmware transmission notifying message to the error node during the join receiving state of the error node; the error node receiving the fourth command signal, generating a fifth command signal including a response message corresponding to the received fourth command signal and a synchronization information message for transmitting the firmware, and transmitting the fifth command signal; and the firmware update device receiving the fifth command signal, generating a sixth command signal in response to the received fifth command signal, and transmitting the sixth command signal to the error node during the join receiving state of the error node.

According to a third aspect of the present invention, there is provided a firmware update device used for a wireless sensor network including a plurality of nodes, including: a communication unit capable of transmitting and receiving signals with respect to the plurality of the nodes; a storage unit configured to store firmware of the nodes constituting the wireless sensor network; and a signal processing unit configured to search for neighbor nodes located within a predetermined distance based on the signals received from the communication unit and to designate a node among the searched neighbor nodes, of which the firmware does not match with the firmware of the nodes stored in the storage unit, as an error node, wherein in the case where the plurality of the nodes include a join receiving state for joining a new node to the wireless sensor network, the communication unit establishes a communication link to the error node by using the join receiving state and transmits the firmware stored in the storage unit to the error node through the communication link.

Advantageous Effects

According to the present invention, in the case where a new node is allowed to join to a wireless sensor network, the new node automatically receives firmware to be updated and joins to the network through communication with a parent node, so that it is possible to update firmware of the new node immediately on the spot.

In addition, in the case where some node constituting the wireless sensor network needs to be updated or repaired, by using a firmware update device, it is possible to update firmware of the node immediately on the spot without recalling the node to a factory.

According to the present invention, since the node can be joined and repaired on the spot, it is possible to easily construct and repair the wireless sensor network and reduce cost thereof.

BEST MODE

Hereinafter, firmware updating methods of nodes of wireless sensor networks, where a plurality of nodes are included, according to embodiments of the present invention are described in detail with reference to the attached drawings. FIGS. 1 to 8 are diagrams for explaining firmware updating methods of nodes of a wireless sensor networks according to first and second embodiments of the present invention. The updating methods according to the embodiments are configured by using a TDMA based media access control (MAC) protocol and are adapted to a wireless sensor network where a plurality of nodes are linearly connected. Each node has an active duration A, where data transmission and reception are performed, and an inactive duration B, where data transmission and reception are not performed. Each active duration includes an upstream duration, an intermission duration, and a downstream duration, so that bidirectional data transmission/reception of each node can be performed.

FIGS. 1 to 4 are diagrams for explaining a firmware updating method of a new node, which is newly joined to the wireless sensor network according to the first embodiment of the present invention.

In the firmware updating method according to the first embodiment of the present invention, a new node designates a parent node in the wireless sensor network. After the new node establishes a communication link with the designated parent node, the new node receives firmware from the parent node through the established communication link. The new node is updated and driven with the transmitted firmware, so that the new node is jointed to the wireless sensor network. For the convenience of description, the case where the network is in the upstream state is described, but the present invention can be adapted to the case where the network is in the downstream state.

Figure 1:
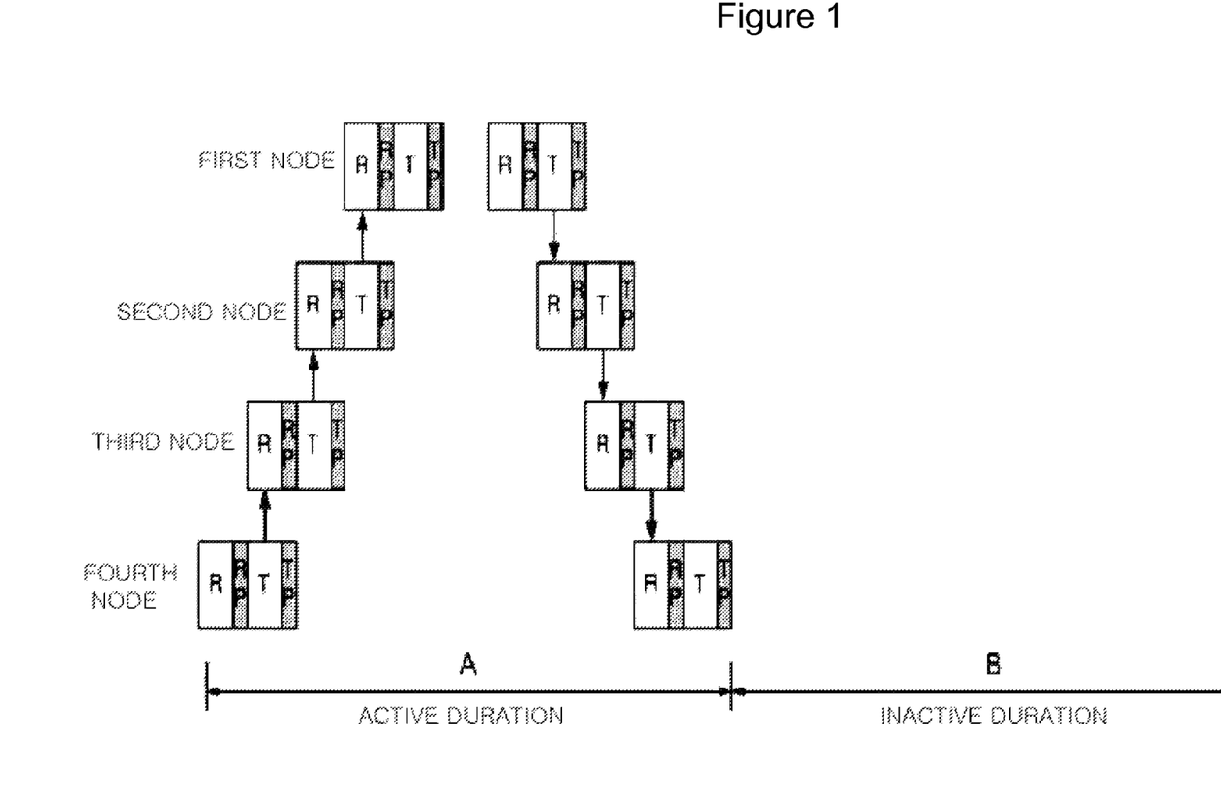
FIGS. 1 to 4 are diagrams for explaining a firmware updating method of a new node of a wireless sensor network according to a first embodiment of the present invention.

As illustrated in FIG. 1, in an upstream duration of an active duration A, each of the nodes (a first node, a second node, a third node, and a fourth node) has time slots including a receive slot R for data reception, a receive processing slot RP for processing after the data reception, a transmit slot T for data transmission, and a transmit processing slot TP for processing after the data transmission.

Figure 2:
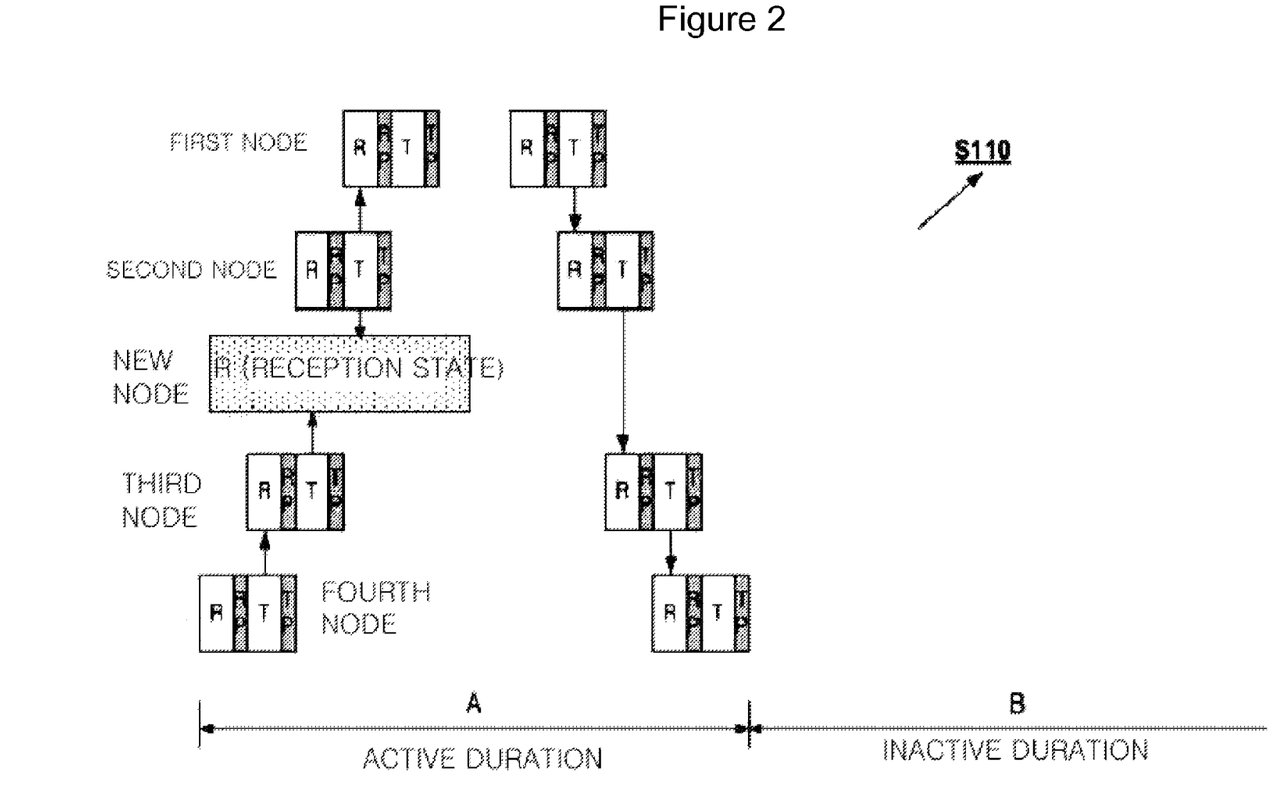

First, the new node illustrated in FIG. 2 sets the communication mode thereof to the receiving mode and searches for neighbor nodes located within a predetermined distance to designate one of the searched neighbor nodes as the parent node (S110). In the embodiment, the second and third nodes are searched as the neighbor nodes, and the second node among the searched nodes is designated as the parent node. In the embodiment, the new node designates the node having the highest intensity of the receiving signal among a plurality of the searched neighbor nodes as the parent node. However, various methods where the new node designates the parent node among the plurality of the searched neighbor nodes may be adapted according to the design method pf the wireless sensor network.

Figure 3:
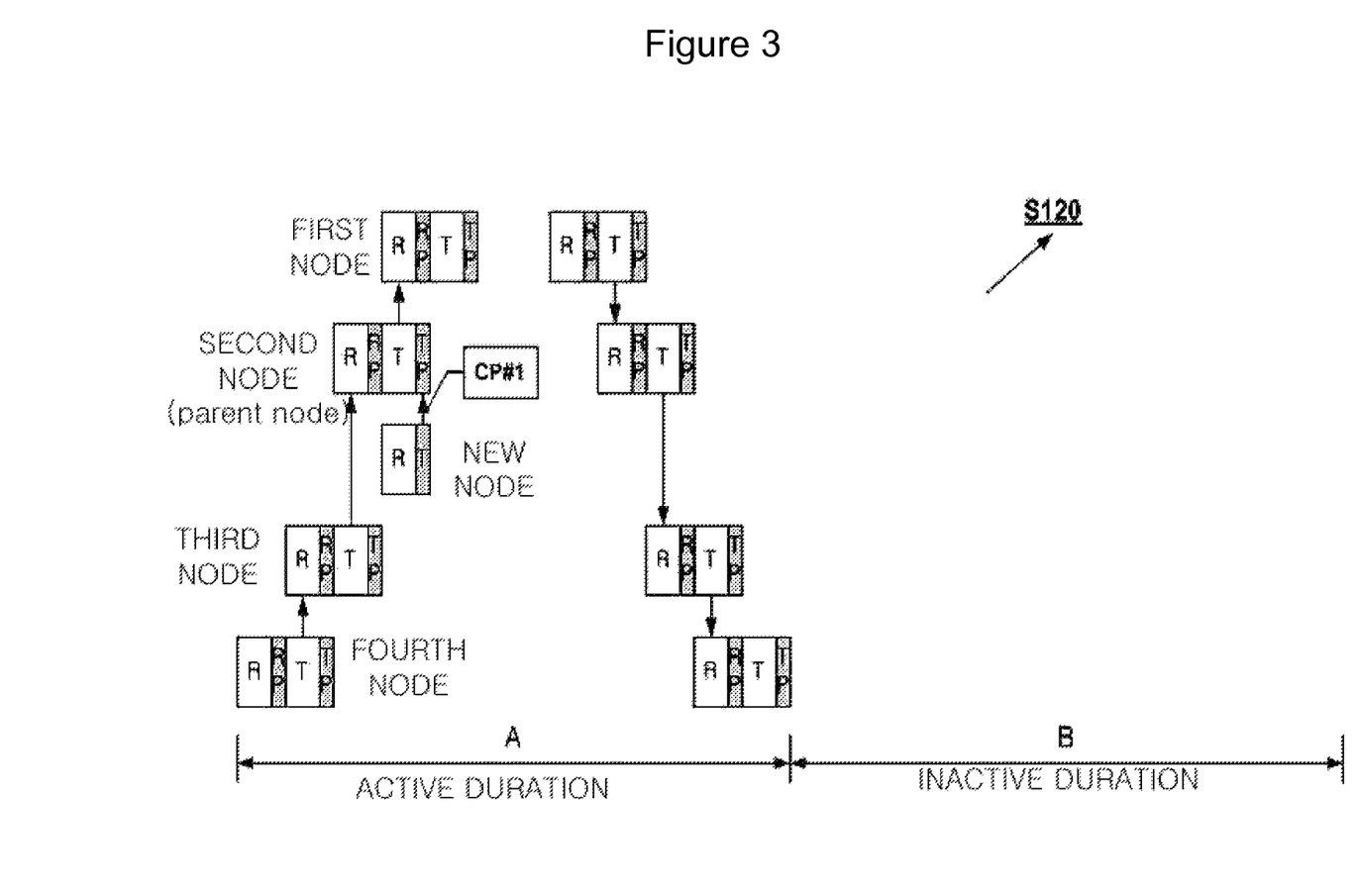
Figure 4:
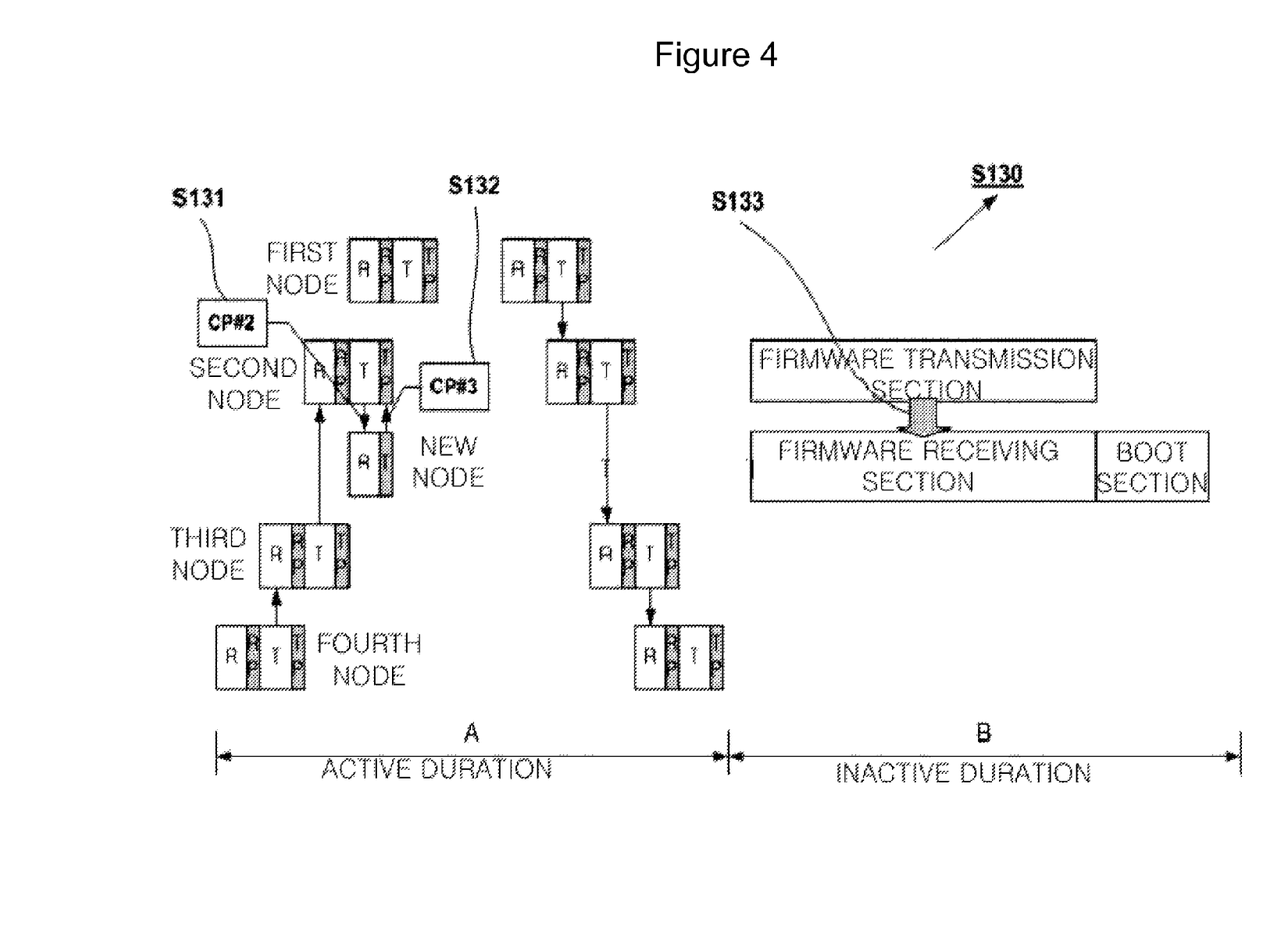

FIGS. 3 and 4 illustrate process where a communication link are established between the designated parent node and the new node and the firmware of the parent node is transmitted through the established communication link to the new node. Herein, the communication link is established by the communication module (not shown) provided to each node.

Referring to FIG. 3, the new node generates time slots including a receive slot R and a transmit slot T so that the receive slot R of the new node is coincident with the transmit slot T of the parent node and so that the transmit slot T of the new node is coincident with the transmit processing slot TP of the parent node. On the other hand, each node of the wireless sensor network according to the present invention maintains the transmit processing slot or the receive processing slot to the receiving mode capable of receiving data from different nodes and uses the transmit processing slot or the receive processing slot to transmit and receive data with respect to the new node. In the specification of the present invention, the state where the receive processing slot the transmit processing slot is operated in the receiving mode as described above is referred to as a "join receiving state".

Next, the new node transmits a first command signal CP#1 including the firmware version information and the join request message of the new node to the parent node during the TP of the parent node (S120).

Next, referring to FIG. 4, the parent node receives the first command signal CP#1 during the TP and compares the firmware version information of the new node included in the received first command signal CP#1 with the version information of the parent node. Next, in the case where the version information does not match with each other, the parent node transmits a second command signal CP#2 including a message notifying non-match of version, a firmware transmission notifying message of the parent node, and a synchronization information message for notifying firmware transmission of the parent node to the new node (S131). Next, the new node receives the second command signal CP#2, generates a third command signal CP#3 in response to the received second command signal CP#2, and transmits the third command signal CP#3 to the parent node during the TP of the parent node (S132). Due to the aforementioned process, the communication link is established between the new node and the parent node, so that the parent node includes a firmware transmission section in the inactive duration and so that the new node includes a firmware receiving section and a boot section in the inactive duration. At this time, the firmware transmission section of the parent node and the firmware receiving section of the new node are coincident with each other.

Next, the parent node transmits the firmware thereof to the new node during the firmware transmission section. At the same time, the new node receives the firmware from the parent node and stores the firmware in an internal memory during the firmware receiving section (S133). Next, the new node is updated and driven with the received firmware during the boot section. Accordingly, the new node that is updated with the latest version of the firmware can be joined to the wireless sensor network.

In this manner, in the firmware updating method for nodes according to the embodiment of the present invention, in the case where a new node is to be joined to a constructed wireless sensor network, it is possible to transmit necessary firmware from a parent node and to update the new node with the firmware on the spot.

FIGS. 5 to 8 are diagrams for explaining a firmware updating method of an error node, where an error occurs, in a wireless sensor network according to a second embodiment of the present invention.

A firmware update device searches for the error node, where an error occurs, among a plurality of the nodes constituting the wireless sensor network and transmits firmware thereof to the searched error node. The error node is updated and driven by the transmitted firmware. For the convenience of description, the case where the network is in the upstream state is described, but the present invention can be adapted to the case where the network is in the downstream state.

Figure 5:
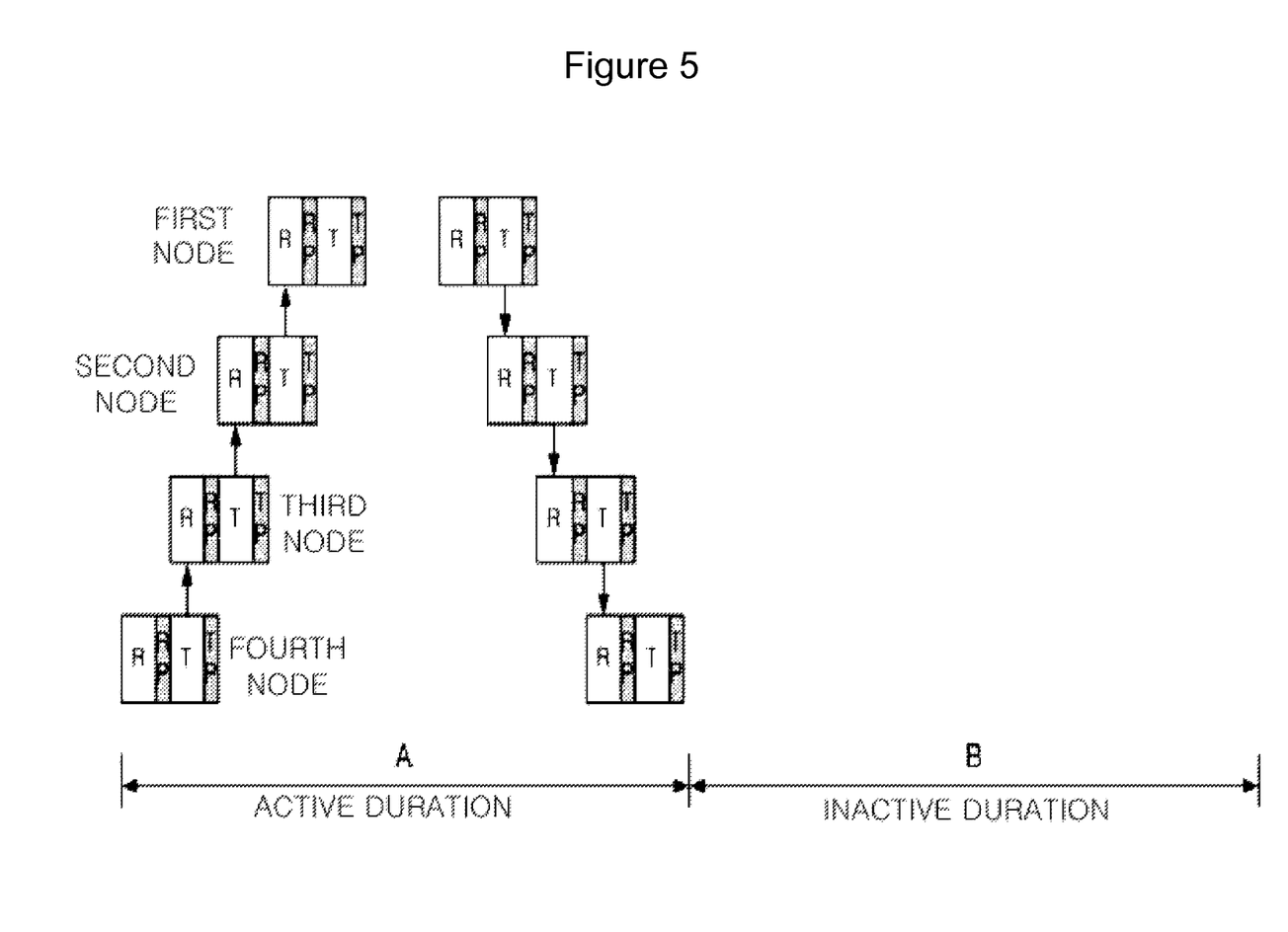
FIGS. 5 to 8 are diagrams for explaining a firmware updating method of an error node of a wireless sensor network according to a second embodiment of the present invention.

FIG. 5 is a diagram for explaining transmission and reception between the nodes of the wireless sensor network, to which the firmware updating method according to the second embodiment of the present invention is adapted. As illustrated in FIG. 5, with respect to each node (a first node, a second node, a third node, and a fourth node), an active duration A and an inactive duration B are alternately repeated. The active duration A includes an upstream duration, an intermission duration, and a downstream duration. Each of the upstream duration and the downstream duration has time slots including a receive slot R for data reception, a receive processing slot RP for processing after the data reception, a transmit slot: T for data transmission, and a transmit processing slot TP for processing after the data transmission. On the other hand, each of the nodes of the wireless sensor network according to the present invention allows the receive processing slot or the transmit processing slot to be operated in a receive mode capable of receiving data from different nodes.

Figure 6:
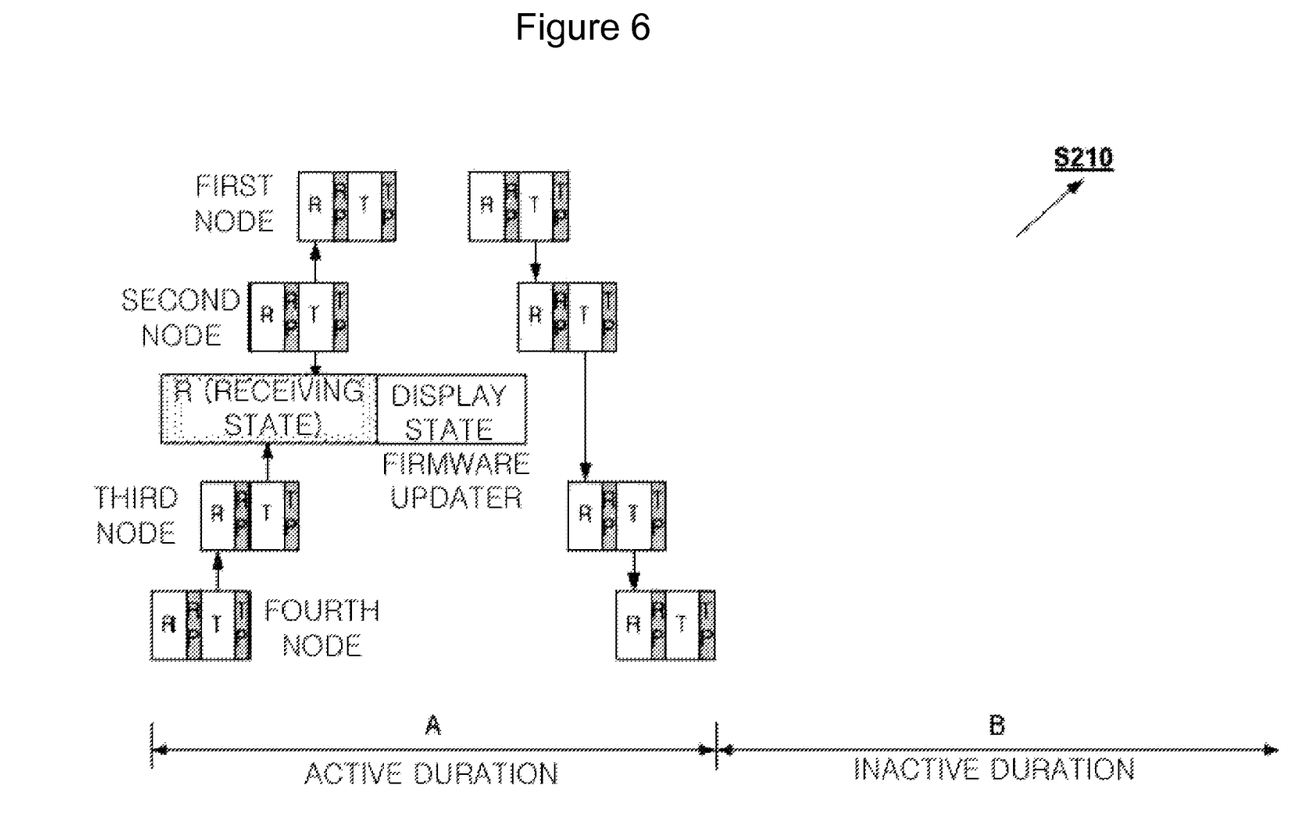

First, as illustrated in FIG. 6, the firmware update device searches for a node that does not have the last version of the firmware among a plurality of the nodes and designates the searched node as an error node (S210). Herein, the firmware update device searches for neighbor nodes located within a predetermined distance during a receiving state R thereof. More specifically, a portable receiving signal intensity (RSSI) Measuring Device (PRMD) may be used as the firmware update device. In addition to detecting the RSSI of the received communication signal, the firmware update device according to the present invention analyses information on a node included in the received communication signal. In addition, the firmware update device includes an additional display unit to display analyzed information on each node such as an address and firmware version information and error nodes on the display unit. In addition, the firmware update device stores the last version of firmware used to update the error node in the storage unit or an internal memory thereof.

A user may determine an error node that needs to be updated and manually select the error node through the information displayed on the display unit.

Figure 7:
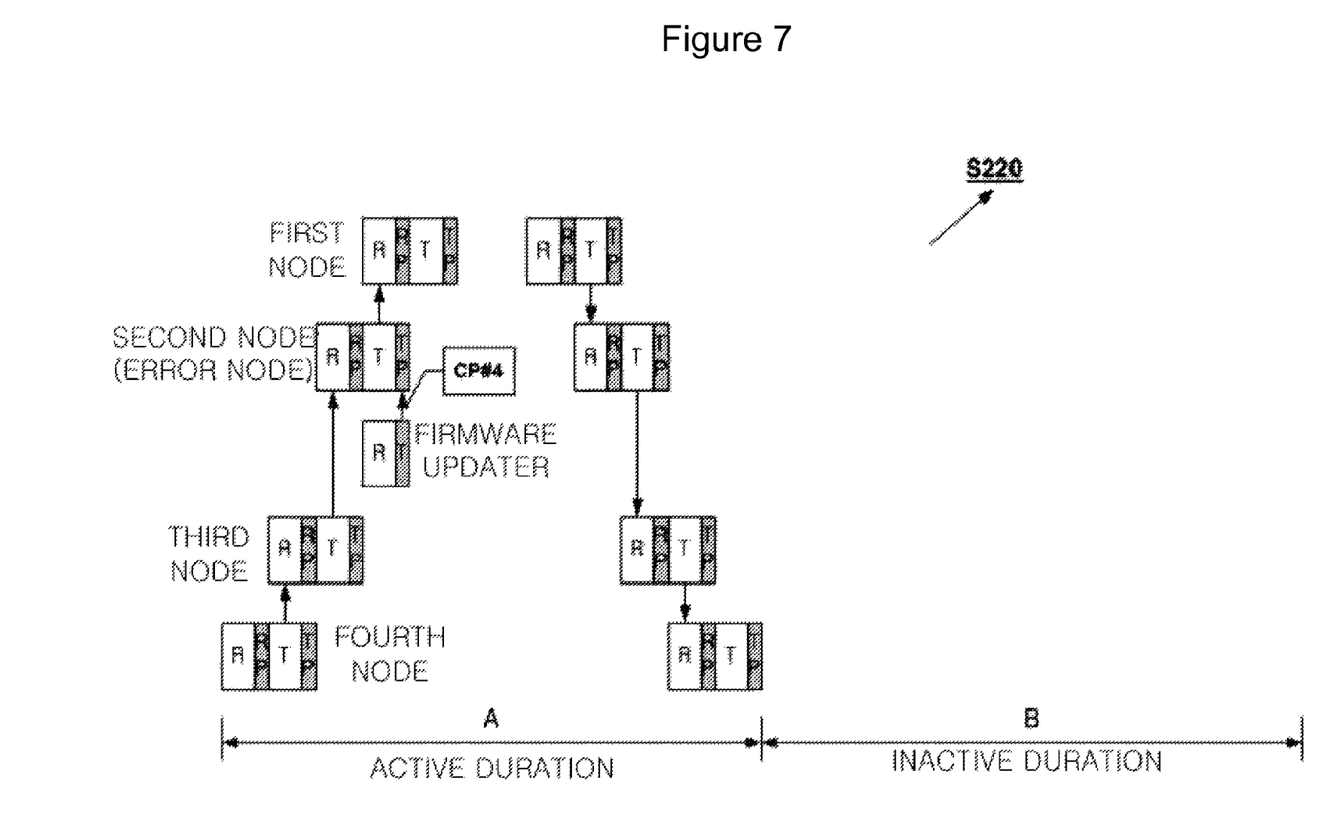
Figure 8:
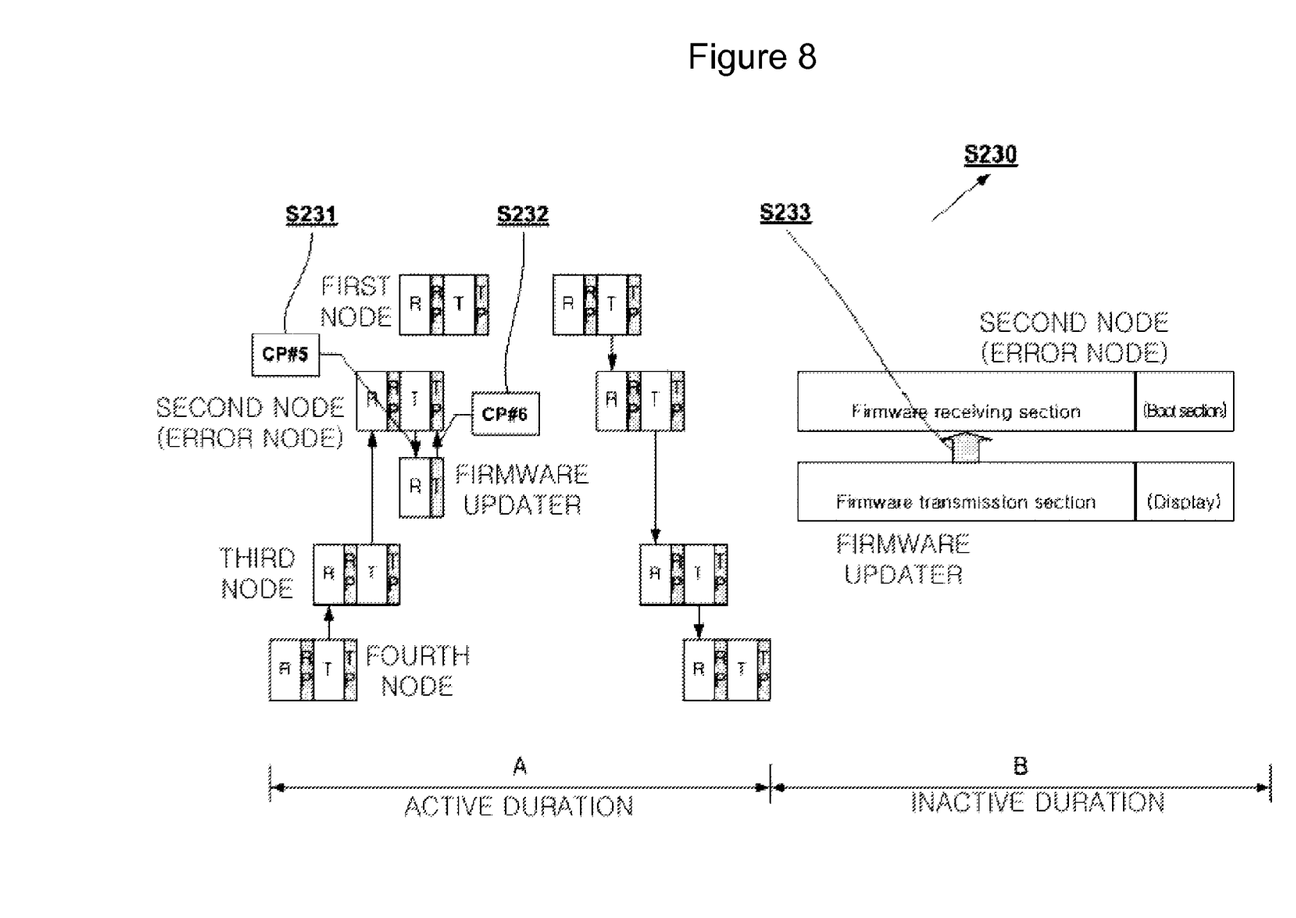

FIGS. 7 and 8 illustrate process where a communication link is established between the error node and the firmware update device and the firmware stored in the firmware update device is transmitted through the established communication link to the error node. Herein, the firmware update device includes a communication module which can communicate with each node.

Referring to FIG. 7, the firmware update device generates time slots including a receive slot R and a transmit slot T so that the receive slot R of the firmware update device is coincident with the transmit slot T of the error node and so that the transmit slot T of the firmware update device is coincident with the transmit processing slot TP of the error node. At this time, the transmit processing slot of the error node is operated in the receiving mode capable of receiving signals from the firmware update device.

In order to establish the communication link to the error node, the firmware update device transmits a fourth command signal CP#4 including a firmware transmission notifying message to the error node during the TP of the error node (S220).

Next, referring to FIG. 8, in the case where the error node receives the fourth command signal CP#4, the error node transmits a fifth command signal CP#5 including a response message corresponding to the fourth command signal CP#4 and a synchronization information message to the firmware update device (S231). Next, the firmware update device receives the fifth command signal CP#5 and transmits a response message corresponding to the received fifth command signal CP#5 to the error node during the TP of the error node (S232). Due to the aforementioned process, the communication link is established between the firmware update device and the error node, so that the firmware update device sets a firmware transmission section and a display section in the inactive duration and so that the error node sets a firmware receiving section and a boot section in the inactive duration. At this time, the firmware transmission section of the firmware update device and the firmware receiving section of the error node are coincident with each other.

Next, the firmware update device transmits the firmware to the error node during the firmware transmission section. At the same time, the error node receives the firmware from the firmware update device and stores the firmware in an internal memory during the firmware receiving section (S233).

Next, the error node is updated with the received and stored firmware and driven with the updated firmware during a boot section.

In this manner, in the firmware updating method for the nodes according to the second embodiment of the present invention, it is possible to search for an error node where an error occurs in the firmware by using a portable apparatus such as a firmware update device and to update the firmware of the error node immediately on the spot.

Figure 9:
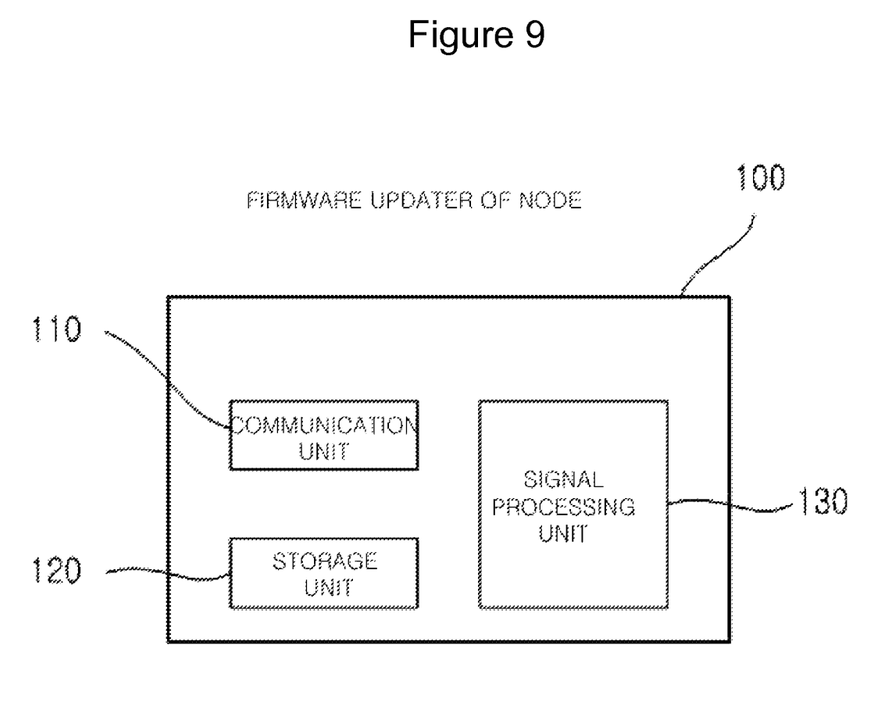
FIG. 9 is a block diagram illustrating a firmware update device used for a wireless sensor network according to a third embodiment of the present invention

FIG. 9 is a schematic block diagram illustrating a firmware update device used for a wireless sensor network according to a third embodiment of the present invention. Referring to FIG. 9, the firmware update device 100 includes a communication unit 110, a storage unit 120, and a signal processing unit 130.

The communication unit 110 is configured with an RF communication module capable of performing transmission and reception with respect to the nodes constituting the wireless sensor network. Herein, the communication unit 110 establishes a communication link with an error node (not shown) which is designated by the signal processing unit 130 and transmits the firmware stored in the signal processing unit 130 through the communication link to the error node. In particular, in the case where each of the nodes constituting the wireless sensor network is in a join receiving state where the transmit processing slot TP is set in a receiving mode, the communication unit 110 establishes the communication link with respect to the node by using the join receiving state. In other words, the receive slot of the communication unit is generated to be coincident with the transmit slot of the error node, the transmit slot of the communication unit is generated to be coincident with the transmit processing slot of the error node, and the firmware transmission section of the communication unit is generated to be coincident with the firmware receiving section of the error node.

The storage unit 120 stores the last version of firmware of the nodes constituting the wireless sensor network. It is preferable that the storage unit 120 is constructed with a non-volatile memory device.

The signal processing unit 130 searches for neighbor nodes located within a distance among a plurality of nodes based on the signal received from the communication unit 110 and designates a neighbor node among the searched neighbor nodes, of which the firmware does not match with firmware of a node stored in a storage unit, as an error node. As described above, the firmware update device 100 may be implemented by using a PRMD.

In this manner, the aforementioned firmware update device 100 for the nodes can be easily carried and stores firmware for the nodes therein, so that detection and firmware updating of error nodes can be performed immediately on the spot.

INDUSTRIAL APPLICABILITY

A method of updating nodes constituting a wireless sensor network according to the present invention may be widely used in the field of the wireless sensor network where sensor nodes are distributed over various areas.

The invention claimed is:

1. A method of updating firmware of a node on a wireless sensor network including a plurality of nodes, comprising steps of:
   (a) a new node searching for neighbor nodes located within a predetermined distance;
   (b) the new node designating a parent node among the searched neighbor nodes;
   (c) in the case where the plurality of nodes include a join receiving state for joining the new node to the wireless sensor network, the designated parent node and the new node establishing a communication link by using the join receiving state;
   (d) the parent node transmitting firmware to the new node through the established communication link; and
   (e) the new node receiving the firmware from the parent node, updating existing firmware with the received firmware, and driving the updated firmware to be jointed to the wireless network,
   wherein each of the nodes of the wireless sensor network is configured based on a time division multiple access ("TDMA") where an active duration and an inactive duration are alternately repeated, and wherein the step (a) to (c) are performed during the active duration, and the step (d) is performed during the inactive duration,
   wherein each of the nodes has time slots including a transmit slot for data transmission, a transmit processing slot for processing after the data transmission, a receive slot for data reception, and a receive processing slot for processing after the data reception during the active duration, and
   wherein in the step (c), the join receiving state is maintained in a receiving mode capable of receiving a signal from a different node during one of the transmit processing slot and the receive processing slot.

2. The method according to claim 1, wherein the step (c) includes steps of:
   the new node transmitting a first command signal including firmware version information of the new node and a join request message to the parent node during the join receiving state of the parent node;
   in the case where the parent node receives the first command signal and the firmware version information of the received does not match with the version information of the parent node, the parent node transmitting a second command signal including a version non-matching message, a firmware transmission notifying message of the parent node, and a synchronization information message for transmitting firmware of the parent node to the new node; and
   the new node receiving the second command signal, generating a third command signal in response to the received second command signal, and transmitting the third command signal to the parent node during the join receiving state of the parent node.

3. A method of updating firmware of a node on a wireless sensor network including a plurality of nodes by using a firmware update device capable of detecting and analyzing a received signal and storing firmware of nodes constituting the wireless sensor network, comprising steps of:
(a) the firmware update device searching for neighbor nodes located within a predetermined distance;
(b) the firmware update device designating an error node, of which the firmware is different from the firmware of the firmware update device, among the searched neighbor nodes;
(c) in the case where the plurality of the nodes include a join receiving state for joining a new node to the wireless sensor network, the designated error node and the firmware update device establishing a communication link by using the join receiving state;
(d) transmitting the firmware stored in the firmware update device to the error node through the established communication link; and
(e) the error node receiving the firmware transmitted from the firmware update device, updating existing firmware with the received firmware, and after that, executing the update firmware,
wherein each of the nodes of the wireless sensor network is connected based on a time division multiple access ("TDMA") where an active duration and an inactive duration are alternately repeated, and wherein the step (a) to (c) are performed during the active duration, and the step (d) is performed during the inactive duration,
wherein each of the nodes has time slots including a transmit slot for data transmission, a transmit processing slot for processing after the data transmission, a receive slot for data reception, and a receive processing slot for processing after the data reception during the active duration, and
wherein in the step (c), the join receiving state is maintained in a receiving mode capable of receiving a signal from a different node during one of the transmit processing slot and the receive processing slot.

4. The method according to claim 3, wherein the step (c) includes steps of:
the firmware update device transmitting a fourth command signal including the firmware transmission notifying message to the error node during the join receiving state of the error node;
the error node receiving the fourth command signal, generating a fifth command signal including a response message corresponding to the received fourth command signal and a synchronization information message for transmitting the firmware, and transmitting the fifth command signal; and
the firmware update device receiving the fifth command signal, generating a sixth command signal in response to the received fifth command signal, and transmitting the sixth command signal to the error node during the join receiving state of the error node.

5. The method according to claim 3, wherein the firmware update device displays addresses and firmware information of the neighbor nodes searched in the step (a).

* * * * *